United States Patent [19]
Kwak et al.

[11] Patent Number: 5,694,179
[45] Date of Patent: Dec. 2, 1997

[54] APPARATUS FOR ESTIMATING A HALF-PEL MOTION IN A VIDEO COMPRESSION METHOD

[75] Inventors: Jin Suk Kwak; Kang Whan Lee; Jin Woong Kim; Young Sun Lee; Joo Hong Jeong; Chie Teuk Ahn, all of Daejeon, Rep. of Korea

[73] Assignees: Electronics and Telecommunications Research Institute, Daejeon; Korea Telecommunication Authority, Seoul, both of Rep. of Korea

[21] Appl. No.: 717,733

[22] Filed: Sep. 19, 1996

Related U.S. Application Data

[63] Continuation-in-part of Ser. No. 551,976, Nov. 2, 1995, abandoned.

[30] Foreign Application Priority Data

Dec. 23, 1994 [KR] Rep. of Korea ............... 1994-37006

[51] Int. Cl.$^6$ ................................................. H04N 7/32
[52] U.S. Cl. ................................... 348/699; 348/409
[58] Field of Search ............................ 348/384, 390, 348/400–402, 407, 409–413, 415, 416, 420, 699; 382/232, 236, 238; H04N 7/137

[56] References Cited

U.S. PATENT DOCUMENTS

| | | |
|---|---|---|
| 4,937,666 | 6/1990 | Yang ........................ 348/413 |
| 5,317,397 | 5/1994 | Odaka et al. ................ 348/416 |
| 5,355,168 | 10/1994 | Sugiyama ................... 348/407 |
| 5,398,079 | 3/1995 | Liu et al. .................... 348/699 |
| 5,408,269 | 4/1995 | Tsukagoshi .................. 348/402 |
| 5,489,949 | 2/1996 | Jeong et al. ................. 348/699 |
| 5,493,344 | 2/1996 | Yu ............................. 348/699 |

*Primary Examiner*—Richard Lee
*Attorney, Agent, or Firm*—Jacobson, Price, Holman & Stern, PLLC

[57] ABSTRACT

An apparatus for estimating a half-pel motion comprising: a memory for storing motion-compensation errors in integer-pel positions; an address generator for generating an address of the integer-pel positions to the memory; an operator for receiving the motion-compensation errors from the memory, and calculating motion-compensation errors in the eight half-pel positions which are on the outskirts of the integer-pel position having a minimum motion-compensation error; and a comparator and half-pel motion vector selector for comparing the motion-compensation errors in the eight half-pel positions with the minimum motion-compensation error in the integer-pel position and selecting a position having a minimum motion-compensation error as a final half-pel motion vector.

1 Claim, 4 Drawing Sheets

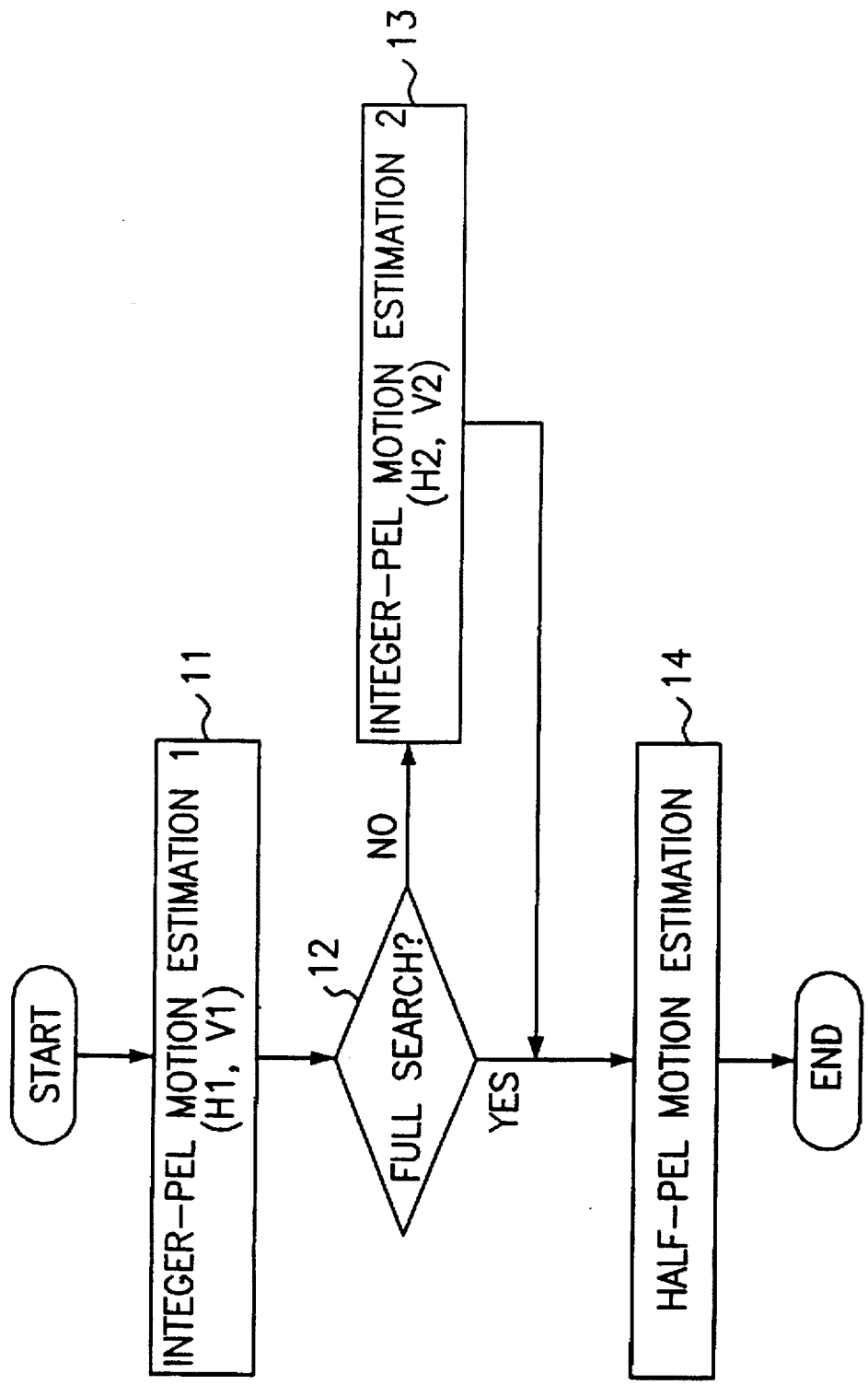

APPARATUS FOR ESTIMATING A HALF-PEL MOTION IN A VIDEO COMPRESSION METHOD

This is a continuation-in-part of Ser. No. 08/551,976, filed on Nov. 2, 1995, now abandoned.

FIELD OF THE INVENTION

The present invention relates to an apparatus for effectively estimating a half-pel motion, providing improved performance, and more particularly, relates to an apparatus for reducing the calculations which are desired in the operation of a half-pel motion estimation.

BACKGROUND OF THE INVENTION

Generally, for estimating a half-pel motion, an error must first be obtained in each of the half-pel positions around the integer-pel motion vectors. There are two conventional methods which are used for estimating the half-pel motion.

The first method comprises the steps of obtaining integer-pel motion vectors, and obtaining, by interpolation, the values of each pixel in the half-pel positions around these vectors, and determining half-pel motion vector from the position having the smallest error by performing a full search for the integer-pel motion vectors and the eight half-pels on the outskirts thereof.

However, in the above mentioned method of performing the full search, there have been problems in the amount of hardware and the additional time desired.

The second method comprises the steps of obtaining approximately motion-compensation errors in the process of obtaining the integer-pel motion vector, and obtaining motion-compensation errors in position of the half-pels by using the model for the motion-compensation errors in the half-pel, and performing the half-pel motion estimation using these errors.

However, in case of the above method, the performance is influenced by the model for errors. Also, since the motion-compensation errors converge on a minimum error without discrimination in all directions at the time of setting the model, it is difficult to expect the performance to improve to a certain extent.

SUMMARY OF THE INVENTION

An object of the present invention is therefore to provide an apparatus for reducing the amount of hardware and time, which is desired in the operation of a half-pel motion estimation, and to provide the improved performance, through the modeling considering the convergence grade of the errors in accordance with each direction.

According to one aspect of the present invention, there can be provided an apparatus for estimating a half-pel motion comprising: a first means for storing motion-compensation errors in integer-pel positions; a second means for generating an address of the integer-pel positions to said first means; a third means for receiving the motion-compensation errors from said first means, and calculating motion-compensation errors in the eight half-pel positions which are on the outskirts of the integer-pel position having a minimum motion-compensation error; and a fourth means for comparing the motion-compensation errors in the eight half-pel positions with the minimum motion-compensation error in the integer-pel position and selecting a position having a minimum motion-compensation error as a final half-pel motion vector.

According to another aspect of the present invention, there can be provided an apparatus for estimating a half-pel motion comprising: a first means for storing motion-compensation errors in integer-pel positions; a second means for generating an address of the integer-pel positions to said first means; a third means for receiving the motion-compensation errors from said first means, and calculating the motion-compensation errors in the four half-pel positions in the upper, down, right and left side of the integer-pel position having a minimum motion-compensation error; and a fourth means for comparing the motion-compensation errors in the half-pel positions, which is in the right and left side of the integer-pel position, with the minimum motion-compensation error in the integer-pel position and selecting a position having a minimum motion-compensation error as a horizontal component of a final half-pel motion vector, and for comparing the motion-compensation errors in the half-pel positions, which is in the upper and down side of the integer-pel position, with the minimum motion-compensation error in the integer-pel position and selecting a position having a minimum motion-compensation error as a vertical component of a final half-pel motion vector.

BRIEF DESCRIPTION OF THE DRAWINGS

The above and other aspects and advantages of the present invention are described in conjunction with the following drawing figures, in which:

FIG. 1 is a flow chart illustrating a motion-estimating part in accordance with the present invention;

DETAILED DESCRIPTION OF THE INVENTION

Hereinafter, an apparatus for estimating a half-pel motion in accordance with the present invention will be described referring to FIGS. 1 through 3.

First, FIG. 1 shows a method for estimating a half-pel motion in accordance with the present invention. As shown in FIG. 1, at step 11, integer-pel motion vectors are obtained by different motion-estimation manners such as a full search, a hierarchical search and the like. At this time, an area of the search is accomplished in the horizontal (H1) and vertical (V1) direction.

If the integer-pel motion vectors are obtained, at step 12, the manner used at the time of estimating the motions is examined. That is, step 12 examines whether the manner is the full search or the hierarchical search. If the result is the full search, the motion-compensation errors are obtained in all integer-pel positions within the search area. However, if the result is not a full search but instead is the hierarchical search or some other searches, the integer-pel position errors to be used for the half-pel motion estimation will not be obtained. Accordingly, at step 13, the errors in the integer-pel positions around the motion vector, which are obtained at step 11, are obtained in the process of executing the integer-pel motion estimation. The area of the search at step 13 is accomplished in the horizontal (H2) and vertical direction (V2). At step 14, the half-pel motion estimation is accomplished using the motion vectors and errors in integer-pel positions around them.

Figure 2B:
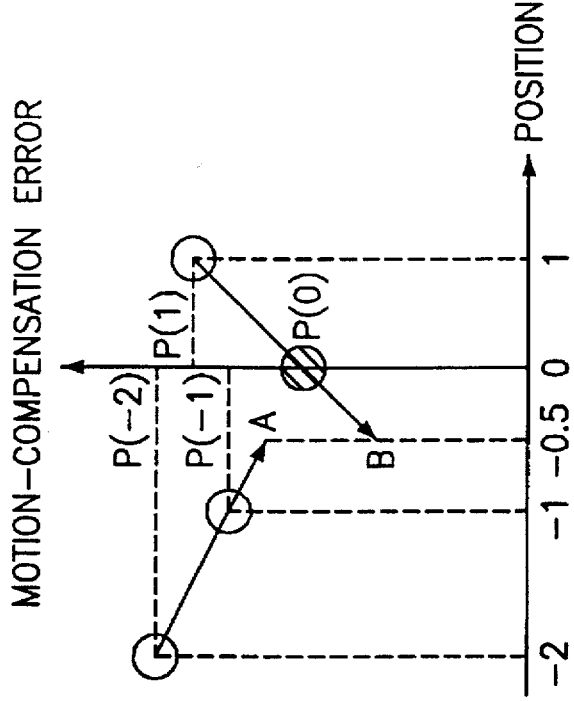
FIG. 2A and 2B are views illustrating a modeling for half-pel motion-compensation errors in accordance with the present invention.
Figure 2A:
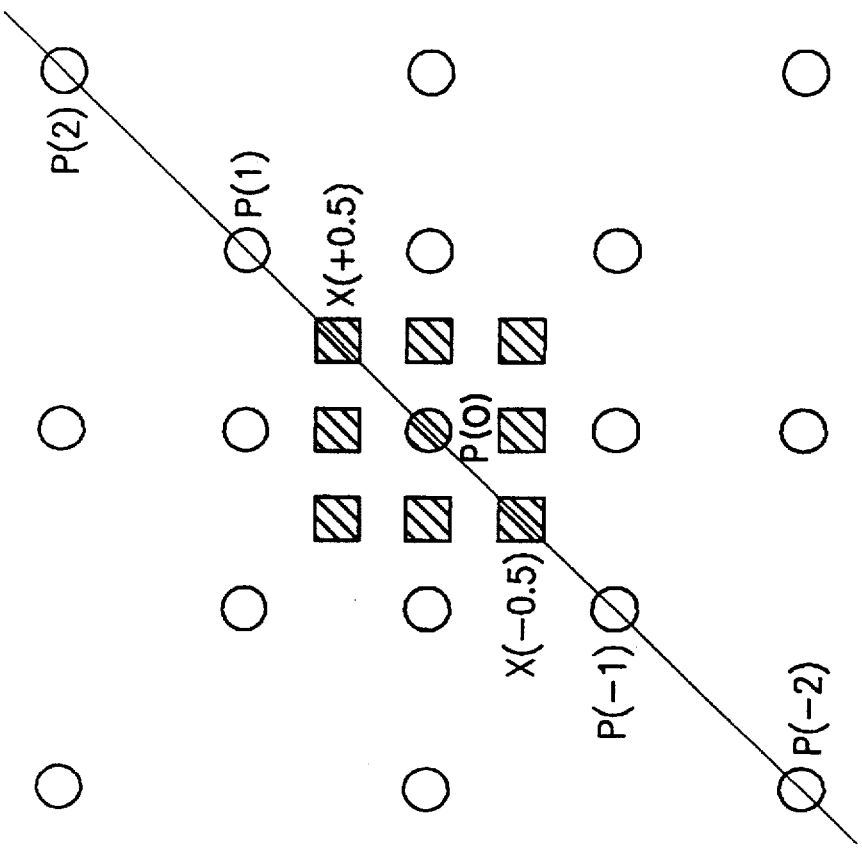

FIGS. 2A and 2B illustrate a method for executing the half-pel motion estimation, as shown in FIG. 1.

In FIG. 2A, the center circle and sixteen circles on the outskirts thereof represent the position of the minimum motion-compensation error and the position of the integer-pel motion-compensation error on the outskirts thereof, which result from the process at step 11 and 13 in FIG. 1.

The eight squares around the center circle represent the positions of the half-pels. At this time, an error in the position of each half-pel is obtained as a approximate value by the modeling in accordance with the present invention. The numerals P and X in the diagonal direction represent the size of a minimum motion-compensation error in the position of themselves. FIG. 2B is a view illustrating the position and the size of the error relative to four integer position errors, p(−2), P(−1), p(0), and P(1), which are used for calculating the size X(−0.5) of the half-pel motion-compensation error, through a rectangular coordinate system having an error and position scale.

Referring to FIG. 2B, the half-pel motion-compensation error X(−0.5) to be obtained is modeled as follows:

$$X(-0.5)=a(A+B)+C \qquad (1)$$

where a is a weight coefficient, C is an offset to amend a prediction value in each half-pel position, and is determined by four integer-pel motion-compensation errors, which are taken two by two on both sides, on the basis of the half-pel position which is now predicted.

Also, in equation (1), A and B are linearly predicted values in accordance with the convergence grade of the motion-compensation errors in each direction, as shown in FIG. 2B. That is, $$A=P(-1)-abs(P(-2)-P(-1))/2 \quad B=P(0)-abs(P(1)-P(0))/2 \qquad (2)$$

Equations (1) and (2) are equally applied to the modeling in the diagonal, horizontal and vertical direction. The motion-compensation error in each of the eight half-pel positions is approximately obtained by the above mentioned modeling. A final half-pel motion vector is the position having a minimum error which is one of errors in positions of the eight half-pels to be obtained and in the center.

For example, if a=¼ and C=abs(P(−1)+P(0))/4, the half-pel motion-compensation error X(=0.5) is describe as follows:

$$X(-0.5)=P(-1)/2+5P(0)/8-P(1)/8-abs(P(-2)-P(-1))/8 \qquad (3)$$

Similarly, the half-pel motion-compensation error X(=+0.5) is obtained using P(−1), P(0), P(1), and P(2), as follows:

$$X(+0.5)=P(1)/2+5P(0)/8-P(-1)/8-abs(P(2)-P(1))/8 \qquad (4)$$

The method for estimating a half-pel motion, in accordance with the above equations (1) and (2) of the present invention, provides a satisfactory performance and has the advantages of being realized by a little quantity of hardware.

Next, referring to FIG. 3, the half-pel motion estimator in accordance with an embodiment of the present invention will be described below.

Figure 3:
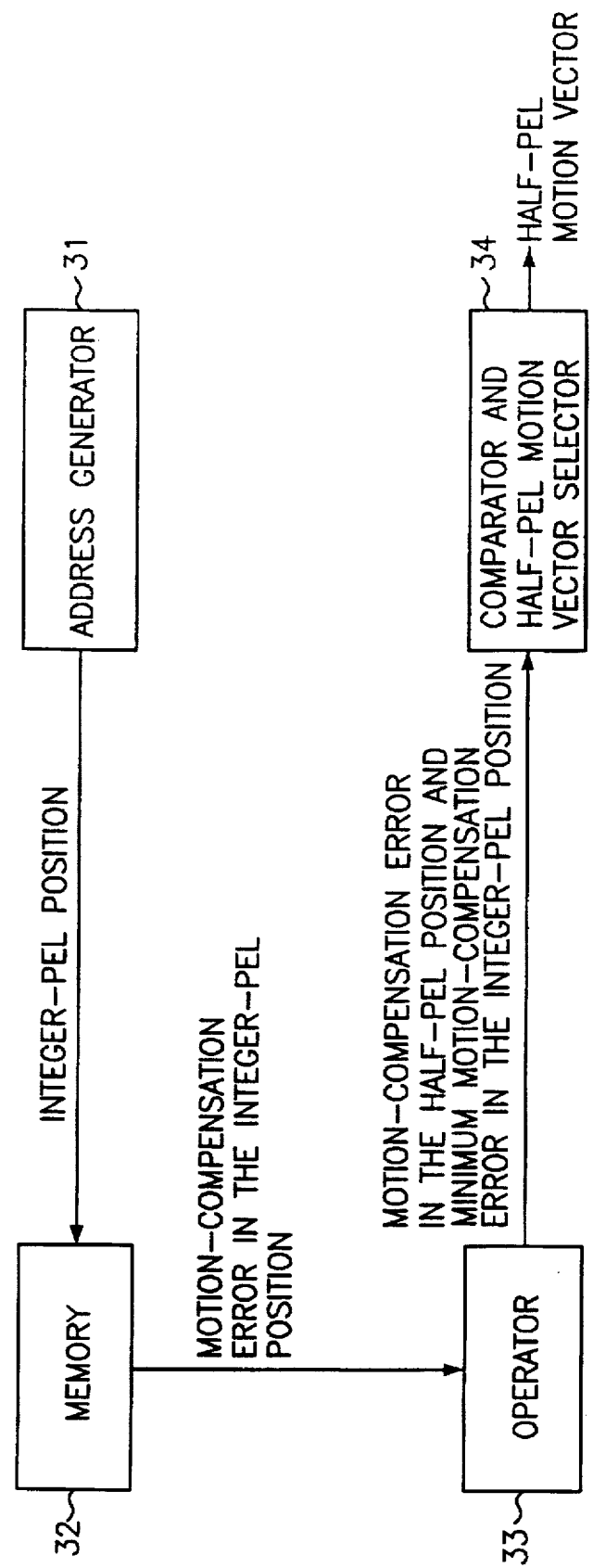
FIG. 3 is a view illustrating the structure of a motion estimator in accordance with the present invention.

As shown in FIG. 3, a address generator 31 generates memory addresses for a memory 32 to output the motion-compensation errors in the integer-pel position, which are used for calculating each of the motion-compensation errors in the half-pel position.

An operator 33 receives the motion-compensation errors in the integer-pel position from the memory 32, and calculates the motion-compensation errors in the eight half-pel positions on the outskirts of the integer-pel position having the minimum motion-compensation errors, using the above equations (1) and (2), and send the result to a comparator and half-pel motion vector selector 34.

Finally, the comparator and half-pel motion vector selector 34 compares the motion-compensation errors in the eight half-pel positions with the minimum motion-compensation errors in the integer-pel position, and outputs the position having the minimum motion-compensation errors as a final half-pel motion vector.

Next, the half-pel motion estimator in accordance with another embodiment of the present invention will be described below.

The address generator 31 generates memory addresses for the memory 32 to output the motion-compensation errors in the integer-pel position in the horizontal and vertical direction, which are used for calculating each of the motion-compensation errors in the half-pel position.

The operator 33 receives the motion-compensation errors in the integer-pel position from the memory 32 and calculates the motion-compensation errors in the half-pel positions in the horizontal and vertical direction, centering the integer-pel position having the minimum motion-compensation errors, using the above equations (1) and (2), and sends the result to the comparator and half-pel motion vector selector 34.

Figure 4:
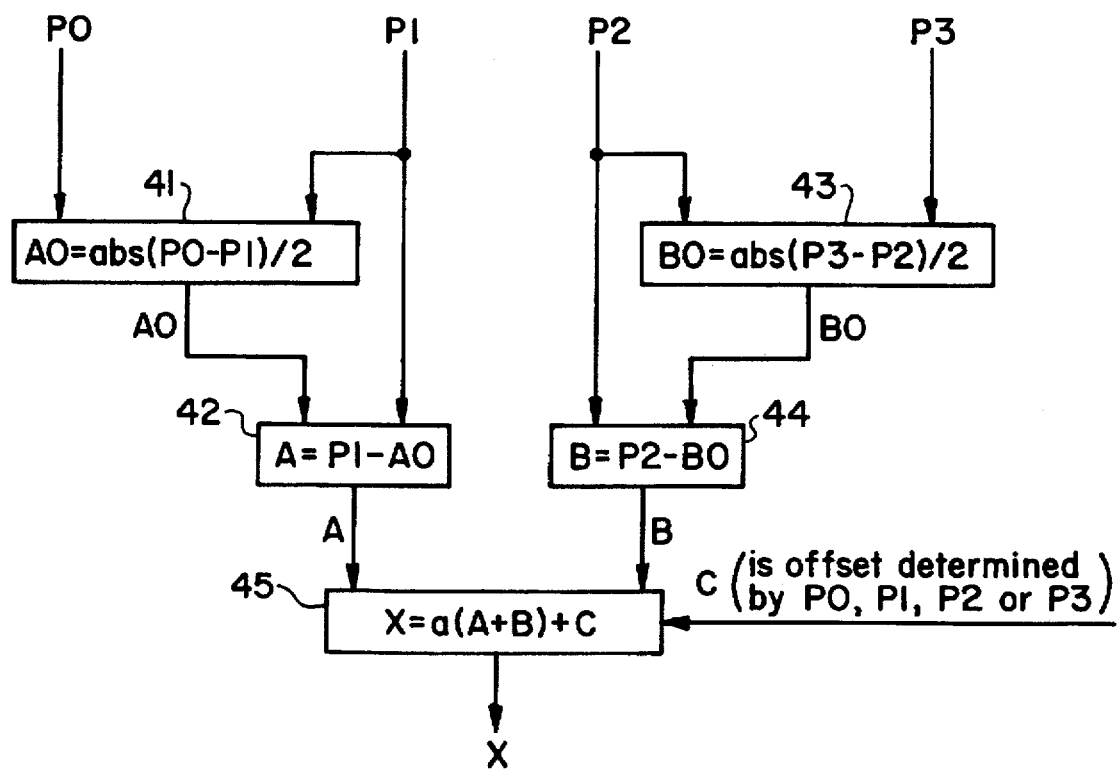
FIG. 4 shows the detailed structure of the operator in FIG. 3 in accordance with the present invention.

FIG. 4 illustrates a structure of the operator 33 as shown in FIG. 3. P0, P1, P2 and P3 are motion-compensation errors in integer-pel positions which are used for calculating approximate errors in half-pixel positions, and X is an approximate motion-compensation error at a random half-pixel position. If the random half-pixel position is −0.5, then P0, P1, P2, P3 and X become P(−2), P(−1), P(0), P(1) and X(−0.5), respectively. If the random half-pixel position is +0.5, then P0, P1, P2, P3 and X become P(2), P(1), P(0), P(−1) and X(+0.5), respectively. As shown in FIG. 4, the operator 33 receives the motion-compensation errors in the integer-pel positions and calculates the approximate motion-compensation errors in the 8 half-pixel positions, sequentially. Then, the operator 33 sends the result to the comparator and half-pel motion vector selector 34.

FIG. 4 further illustrates a first calculating unit 41, a second calculating unit 42, a third calculating unit 43, a fourth calculating unit 44 and a fifth calculating unit 45. The first calculating unit 41 receives motion-compensation errors P0 and P1 in integer-pel positions and outputs A0, which is a absolute value of a difference value (A0=abs(P0−P1)/2). The second calculating unit 42 receives A0 and a motion-compensation error P1 in an integer-pel position, and outputs A, which is a difference value (A=P1−A0). The third calculating unit 43 receives motion-compensation errors P2 and P3 in integer-pel positions and outputs B0, which is an absolute value of a difference value (B0=abs(P3−P2)/2). The fourth calculating unit 44 receives B0 and a motion-compensation error P2 in an integer-pel position, and outputs B, which is a difference value (B=P2−B0). Finally, the fifth calculating unit 45 outputs an approximate motion-compensation error X=a(A+B)+C (a is a weight coefficient and C is an offset to adjust a prediction value obtained by the motion-compensation errors P0, P1, P2 and P3 in the integer-pel positions which are used for calculating a motion-compensation error X).

The comparator and half-pel motion vector selector 34 compares the minimum motion-compensation errors in integer-pel positions with the motion-compensation errors in the half-pel position in the right and left side thereof, and outputs the position having the minimum motion-compensation errors as a vertical component of the final half-pel motion vector. Similarly, the comparator and half-pel motion vector selector 34 compares the minimum motion-compensation errors in integer-pel positions with the motion-compensation errors in the half-pel position in the upper and lower side thereof, and outputs the position having the minimum motion-compensation errors as a horizontal component of the final half-pel motion vector.

As stated above, the present invention has effects on the reduction of operations and hardware, and provides improved performance of the half-pel motion estimation.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A motion compensation apparatus for estimating a half-pel motion, comprising:

a first calculating means for receiving motion-compensation errors P0 and P1 in integer-pel positions and for outputting an absolute value of a first difference value A0, wherein $A0 = \text{abs}(P0-P1)/2$;

a second calculating means for receiving A0 and the motion-compensation error P1 in an integer-pel position and for outputting a second difference value A, wherein $A = P1 - A0$;

a third calculating means for receiving motion-compensation errors P2 and P3 in integer-pel positions and for outputting an absolute value of a third difference value B0, wherein $B0 = \text{abs}(P3-P2)/2$;

a fourth calculating means for receiving B0 and the motion-compensation error P2 in an integer-pel position and for outputting a fourth difference value B, wherein $B = P2 - B0$; and a fifth calculating means for outputting an approximate half-pel motion-compensation error X, wherein $X = a(A+B) + C$, a is a weight coefficient and C is an offset to adjust a prediction value obtained by the motion-compensation errors P0, P1, P2 and P3 in the integer-pel positions which are used for calculating the half-pel motion-compensation error X.

* * * * *